US012644792B2

(12) United States Patent (10) Patent No.: US 12,644,792 B2
Park et al. (45) Date of Patent: Jun. 2, 2026

(54) DISPLAY DEVICE INSPECTING APPARATUS AND METHOD

(71) Applicant: Samsung Display Co., Ltd., Yongin-si (KR)

(72) Inventors: Junsu Park, Yongin-si (KR); Namhyuk Kim, Yongin-si (KR); Sangjun Seok, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 498 days.

(21) Appl. No.: 18/363,931

(22) Filed: Aug. 2, 2023

(65) Prior Publication Data

US 2024/0201045 A1 Jun. 20, 2024

(30) Foreign Application Priority Data

Dec. 19, 2022 (KR) ........................ 10-2022-0178692

(51) Int. Cl.
*G01M 11/08* (2006.01)
*G01B 11/24* (2006.01)
*G01B 11/25* (2006.01)
(52) U.S. Cl.
CPC ....... *G01M 11/081* (2013.01); *G01B 11/2408* (2013.01); *G01B 11/2513* (2013.01); *G01B 11/2527* (2013.01)
(58) Field of Classification Search
CPC .................................................. G01M 11/081
(Continued)

(56) References Cited

U.S. PATENT DOCUMENTS 7,694,578 B2 * 4/2010 Hatfield ................... G01N 3/20
73/789
2021/0221735 A1 7/2021 Hou et al.
2023/0184647 A1 * 6/2023 Jung ................... G01N 33/386

FOREIGN PATENT DOCUMENTS

KR 10-0675566 1/2007
KR 10-1684344 12/2016
(Continued)

OTHER PUBLICATIONS

Ali, Ammar, et al. "Machine learning-based predictive model for tensile and flexural strength of 3D-printed concrete." Materials 16.11 (2023): 4149. (Year: 2023).*
(Continued)

*Primary Examiner* — Walter L Lindsay, Jr.
*Assistant Examiner* — Philip T Fadul
(74) *Attorney, Agent, or Firm* — CANTOR COLBURN LLP

(57) ABSTRACT

A method of inspecting a flexural strength of a glass including a folding area of a display apparatus includes a sample glass surface measurement operation of measuring a three-dimensional shape of a surface of each of a plurality of sample glasses, a sample glass curvature variable calculation operation of calculating a plurality of curvature variables of each of the plurality of sample glasses based on an information measured in the sample glass surface measurement operation, a sample glass flexural strength measurement operation of measuring a flexural strength of each of the plurality of sample glasses, a data analysis operation including a relational expression generation operation of generating a relational expression between the plurality of curvature variables and the flexural strength, and a flexural strength prediction operation of predicting a flexural strength of a target glass based on the relational expression.

20 Claims, 12 Drawing Sheets

(58) Field of Classification Search
USPC ............................................................ 73/800
See application file for complete search history.

(56) References Cited

FOREIGN PATENT DOCUMENTS

| | | |
|---|---|---|
| KR | 10-1833245 | 3/2018 |
| KR | 10-2018-0058254 | 6/2018 |
| KR | 10-2021-0115117 | 9/2021 |
| KR | 10-2400742 | 5/2022 |

OTHER PUBLICATIONS

Macrelli, G., "Chemically strengthened glass by ion exchange: Strength evaluation." International Journal of Applied Glass Science, 9(2), 156-166 (2017).

* cited by examiner

SGL1, SGL2, ⋯ , SGLN
SGL

DISPLAY DEVICE INSPECTING APPARATUS AND METHOD

CROSS-REFERENCE TO RELATED APPLICATION(S)

This application claims priority to and benefits of Korean Patent Application No. 10-2022-0178692 under 35 U.S.C. § 119, filed on Dec. 19, 2022, in the Korean Intellectual Property Office, the entire contents of which are incorporated herein by reference.

BACKGROUND

1. Technical Field

Embodiments relate to an apparatus for inspecting a display apparatus and a method of inspecting a display apparatus.

2. Description of the Related Art

Mobility-based electronic devices have been widely used. Recently, not only compact electronic devices such as mobile phones, but also tablet PCs, are widely being used as mobile electronic devices.

Such mobile electronic devices include display apparatuses to provide users with visual information, such as images or videos, and support various functions. Recently, as other parts for driving a display apparatus are miniaturized, a portion taken by the display apparatus in an electronic device is gradually increased, and a structure to bend a display apparatus with a certain angle from a flat state is under development.

SUMMARY

Embodiments include predicting the flexural strength of glass without glass damage.

However, such an objective is an example, and the objective to be solved by the disclosure are not limited thereto.

Additional aspects will be set forth in part in the description which follows and, in part, will be apparent from the description, or may be learned by practice of the embodiments of the disclosure.

According to an embodiment, a method of inspecting a flexural strength of a glass including a folding area of a display apparatus may include a sample glass surface measurement operation of measuring a three-dimensional shape of a surface of each of a plurality of sample glasses, a sample glass curvature variable calculation operation of calculating a plurality of curvature variables of the each of the plurality of sample glasses based on an information measured in the sample glass surface measurement operation, a sample glass flexural strength measurement operation of measuring a flexural strength of the each of the plurality of sample glasses, a data analysis operation including a relational expression generation operation of generating a relational expression between the plurality of curvature variables and the flexural strength, and a flexural strength prediction operation of predicting a flexural strength of a target glass based on the relational expression. The flexural strength prediction operation may include a target glass surface measurement operation of measuring a three-dimensional shape of a surface of the target glass, a target glass curvature variable calculation operation of calculating a plurality of curvature variables of the target glass based on an information measured in the target glass surface measurement operation, and a target glass flexural strength calculation operation of calculating the flexural strength of the target glass by inputting the plurality of curvature variables calculated in the target glass curvature variable calculation operation in the relational expression.

In an embodiment, the data analysis operation may further include a curvature variable selection operation of selecting a plurality of correlative curvature variables correlated to the flexural strength among the plurality of curvature variables. The relational expression generation operation may be an operation of generating a relational expression between the plurality of correlative curvature variables and the flexural strength.

In an embodiment, the target glass curvature variable calculation operation may be an operation of calculating the plurality of correlative curvature variables of the target glass.

In an embodiment, the target glass flexural strength calculation operation may be an operation of calculating the flexural strength of the target glass by inputting the plurality of correlative curvature variables in the relational expression.

In an embodiment, the plurality of curvature variables may include at least two of a curvature average of an entire surface, a curvature standard deviation of the entire surface, a curvature absolute value average of the entire surface, a curvature absolute value standard deviation of the entire surface, a curvature average of the folding area, a curvature standard deviation of the folding area, a curvature absolute value average of the folding area, and a curvature absolute value standard deviation of the folding area.

In an embodiment, the plurality of correlative curvature variables may include the curvature average of the folding area and the curvature standard deviation of the folding area.

In an embodiment, the method may further include a data storing operation of storing data about the plurality of curvature variables calculated in the sample glass curvature variable calculation operation and the flexural strength measured in the sample glass flexural strength measurement operation.

In an embodiment, the data analysis operation may follow a multiple regression analysis method.

In an embodiment, the sample glass surface measurement operation may be an operation of measuring the three-dimensional shape of the surface of the each of the plurality of sample glasses by using a phase measuring deflectometry.

In an embodiment, the target glass surface measurement operation may be an operation of measuring the three-dimensional shape of the surface of the target glass by using a phase measuring deflectometry.

According to an embodiment, an apparatus for inspecting a flexural strength of a glass including a folding area of a display apparatus may include a surface measurement part that measures a three-dimensional shape of a surface of each of a plurality of sample glasses and a target glass, a flexural strength measurement part that measures a flexural strength of the each of the plurality of sample glasses, and an operation part that calculates a flexural strength of the target glass. The operation part may include a sample glass curvature variable calculation part that calculates a plurality of curvature variables of the each of the plurality of sample glasses based one the three-dimensional shape of the surface of the each of the plurality of sample glasses, a data analysis part including a relational expression generation part that generates a relational expression between the plurality of curvature variables and the flexural strength, and a flexural strength prediction part that predicts the flexural strength of the target glass based on the relational expression. The flexural strength prediction part may include a target glass curvature variable calculation part that calculates the plurality of curvature variables of the target glass based on the three-dimensional shape of the surface of the target glass, and a target glass flexural strength calculation part that calculates the flexural strength of the target glass by inputting the plurality of curvature variables calculated in the target glass curvature variable calculation part in the relational expression.

In an embodiment, the data analysis part may further include a curvature variable selection part that selects a plurality of correlative curvature variables correlated to the flexural strength among the plurality of curvature variables. The relational expression generation part may generate a relational expression between the plurality of correlative curvature variables and the flexural strength.

In an embodiment, the target glass curvature variable calculation part may calculate the plurality of correlative curvature variables of the target glass.

In an embodiment, the target glass flexural strength calculation part may calculate the flexural strength of the target glass by inputting the plurality of correlative curvature variables in the relational expression.

In an embodiment, the surface of the each of the plurality of sample glasses may include a folding area that is foldable. The plurality of curvature variables may include at least two of a curvature average of an entire surface, a curvature standard deviation of the entire surface, a curvature absolute value average of the entire surface, a curvature absolute value standard deviation of the entire surface, a curvature average of the folding area, a curvature standard deviation of the folding area, a curvature absolute value average of the folding area, and a curvature absolute value standard deviation of the folding area.

In an embodiment, the plurality of correlative curvature variables may include the curvature average of the folding area and the curvature standard deviation of the folding area.

In an embodiment, the operation part may further include a database storing data about a plurality of curvature variables calculated by the sample glass curvature variable calculation part and the flexural strength of the each of the plurality of sample glasses measured by the flexural strength measurement part.

In an embodiment, the data analysis part may follow a multiple regression analysis method.

In an embodiment, the surface measurement part may measure the three-dimensional shape of the surface of the each of the plurality of sample glasses and the target glass by using a phase measuring deflectometry.

In an embodiment, the surface measurement part may include a screen part that outputs pattern light to be irradiated onto the surface of the each of the plurality of sample glasses and the target glass, and a camera part that measures the pattern light reflected from the surface of the each of the plurality of sample glasses and the target glass.

Other aspects, features, and advantages than those described above will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
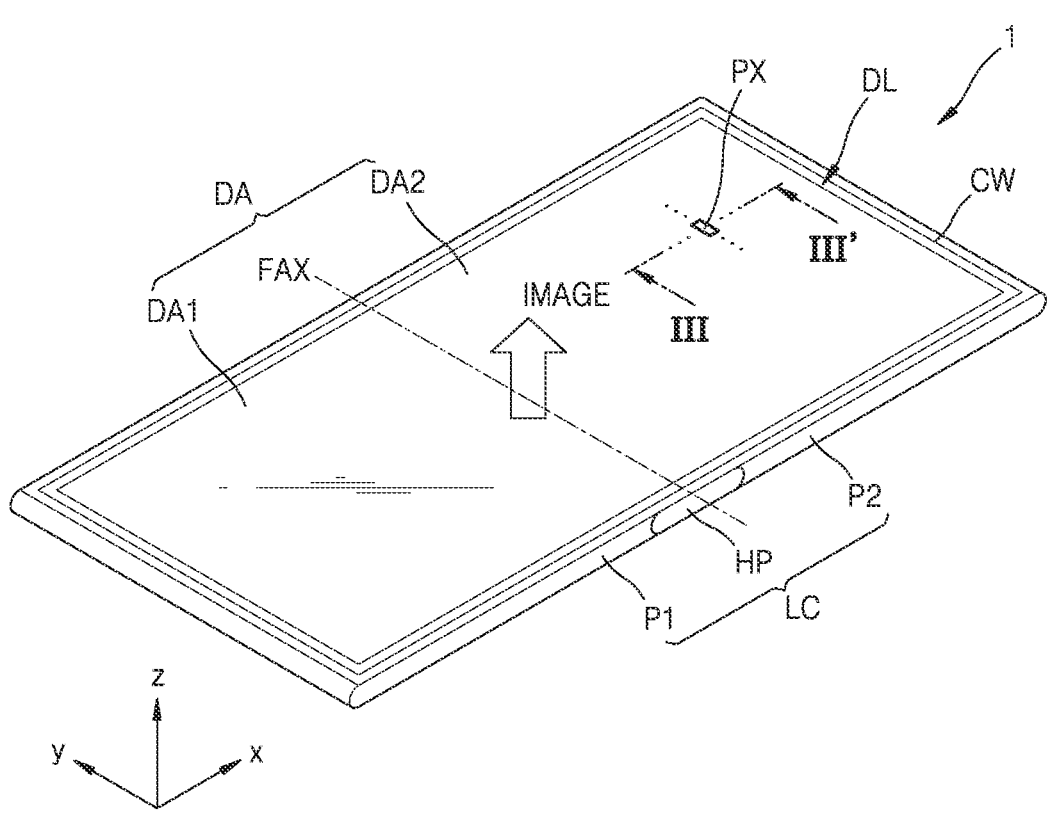
FIG. 1 is a schematic perspective view of a portion of a display apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Various modifications may be applied to the embodiments, and particular embodiments will be illustrated in the drawings and described in the detailed description section. The effect and features of the embodiments, and a method to achieve the same, will be clearer referring to the detailed descriptions below with the drawings. However, the embodiments may be implemented in various forms, not by being limited to the embodiments presented below.

Hereinafter, embodiments will be described in detail with reference to the accompanying drawings, and in the description with reference to the drawings, the same or corresponding constituents are indicated by the same reference numerals and redundant descriptions thereof are omitted.

In the following embodiments, while such terms as "first," "second," etc., may be used to describe various elements, such elements must not be limited to the above terms.

In the following embodiments, the expression of singularity in the specification includes the expression of plurality unless clearly specified otherwise in context.

In the following embodiments, it will also be understood that the terms "comprises," "includes," and "has" used herein specify the presence of stated elements, but do not preclude the presence or addition of other elements, unless otherwise defined.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

Sizes of elements in the drawings may be exaggerated for convenience of explanation. For example, since sizes and thicknesses of elements in the drawings are arbitrarily illustrated for convenience of explanation, the following embodiments are not limited thereto.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 2:
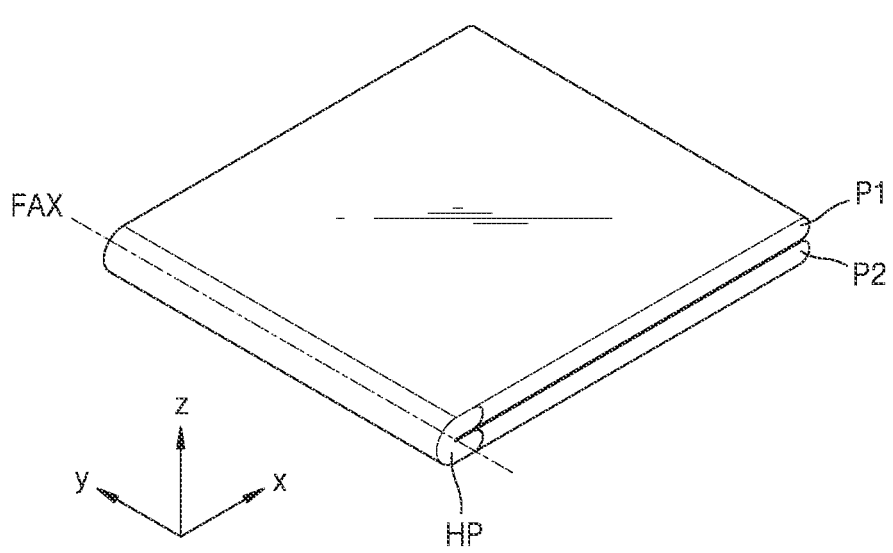
FIG. 2 is a schematic perspective view of a portion of a display apparatus according to an embodiment.

FIGS. 1 and 2 are schematic perspective views of a portion of a display apparatus 1 according to an embodiment. FIG. 1 illustrates that the display apparatus 1 is unfolded, and FIG. 2 illustrates that the display apparatus 1 is folded.

Referring to FIGS. 1 and 2, the display apparatus 1 may include a lower cover LC, a display layer DL, and a cover window CW.

The lower cover LC may include a first part P1 and a second part P2, both supporting the display layer DL. The lower cover LC may be folded with respect to a folding axis FAX defined between the first part P1 and the second part P2. In an embodiment, the lower cover LC may further include a hinge part HP, and the hinge part HP may be provided between the first part P1 and the second part P2.

The display layer DL may include a display area DA. The display layer DL may provide an image through an array of multiple pixels PX arranged in the display area DA. Each of the pixels PX may be defined as a light-emitting area for emitting light by a light-emitting element electrically connected to a pixel circuit. In an embodiment, each pixel PX may emit red, green, or blue light. In another embodiment, each pixel PX may emit red, green, blue, or white light.

The light-emitting element in the display layer DL may include an organic light-emitting diode, an inorganic light-emitting diode, a micro light emitting diode, and/or a quantum-dot light-emitting diode. In the following description, for convenience of explanation, an embodiment in which the light-emitting element in the display layer DL includes an organic light-emitting diode is described, but the disclosure is not limited thereto, and the disclosure may be applied to a display layer DL including other types of light-emitting elements.

The display area DA may include a first display area DA1 and a second display area DA2 which are arranged in each side of the folding axis FAX crossing the display area DA. The first display area DA1 and the second display area DA2 may be located on the first part P1 and the second part P2 of the lower cover LC, respectively. The display layer DL may provide a first image and a second image by using light emitted from the pixels PX arranged in the first display area DA1 and the second display area DA2. In an embodiment, the first image and the second image may be portions of an image provided through the display area DA of the display layer DL. In another embodiment, the display layer DL may provide a first image and a second image which are independent of each other.

The display layer DL may be folded with respect to the folding axis FAX. In case that the display layer DL is folded, the first display area DA1 and the second display area DA2 of the display layer DL may face each other.

Although FIGS. 1 and 2 illustrate an embodiment with a folding axis FAX extending in y-axis direction, the disclosure is not limited thereto. In an embodiment, the folding axis FAX may extend in x-axis direction intersecting y-axis direction. In another embodiment, on an x-y plane, the folding axis FAX may extend in a direction intersecting x-axis direction and y-axis direction.

Furthermore, although FIGS. 1 and 2 illustrate that there is one folding axis FAX, the disclosure is not limited thereto. In an embodiment, the display layer DL may be folded multiple times with respect to multiple folding axes FAX crossing the display area DA.

The cover window CW may be disposed on the display layer DL and may cover the display layer DL. The cover window CW may be folded or bent according to an external force without generating cracks and the like. In case that the display layer DL is folded with respect to the folding axis FAX, the cover window CW may be folded together.

Figure 3:
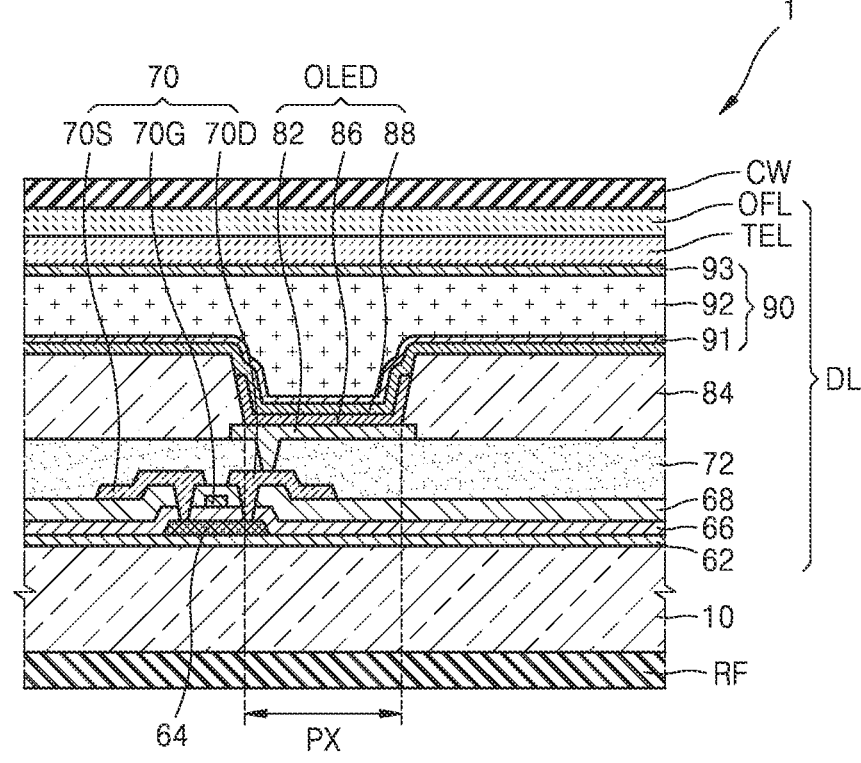
FIG. 3 is a schematic cross-sectional view of a portion of a display apparatus according to an embodiment.
Figure 3:
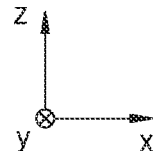

FIG. 3 is a schematic cross-sectional view of a portion of the display apparatus 1 according to an embodiment. FIG. 3 may correspond to a cross-sectional view of the display apparatus 1 taken along line III-III' of FIG. 1.

The display layer DL may be one of, for example, an organic light-emitting display (OLED), a liquid crystal display (LCD), an electrophoretic display (EPD), but the disclosure is not limited thereto. In the following description, an embodiment in which the display layer DL is an OLED is described.

The display layer DL may include an OLED including a pixel electrode 82 disposed on a first substrate 10, a pixel defining layer 84 disposed on the pixel electrode 82 and having an opening for exposing at least a portion of the pixel electrode 82, an intermediate layer 86 disposed on the pixel electrode 82 and including an organic emission layer, and a counter electrode 88 disposed on the intermediate layer 86.

Referring to FIG. 3, a reinforcing substrate RF may be disposed on a lower surface of the first substrate 10. The reinforcing substrate RF may be a substrate that supports the display apparatus 1 from the first substrate 10 through the display layer DL to the cover window CW. The reinforcing substrate RF may include a reinforcing body and a reinforcing layer described below. The reinforcing substrate RF may prevent a crease in a folding area of the display layer DL due to repeated folding.

A buffer layer 62 including an inorganic material, such as a silicon oxide, a silicon nitride, a silicon oxynitride, and/or the like, may be disposed on the first substrate 10. The buffer layer 62 may increase flatness of an upper surface of the first substrate 10 or prevent or reduce infiltration of impurities and the like from the first substrate 10 into an active layer 64 of a thin film transistor 70. In an embodiment, the buffer layer 62 may be omitted.

The thin film transistor 70 may be disposed on the first substrate 10, and the thin film transistor 70 may be electrically connected to the pixel electrode 82. The thin film transistor 70 may include the active layer 64 including a semiconductor material, such as amorphous silicon, polycrystalline silicon, an oxide semiconductor, an organic semiconductor or the like, a gate electrode 70G insulated from the active layer 64, and a source electrode 70S and a drain electrode 70D both electrically connected to the active layer 64. The gate electrode 70G may be disposed above the active layer 64, and in response to a signal applied to the gate electrode 70G, the source electrode 70S and the drain electrode 70D may be electrically connected to each other. The gate electrode 70G may be formed of at least one material of, for example, aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu), in a single layer or multilayer, considering adhesion to an adjacent layer, surface flatness of a stacked layer, machinability, and the like.

To insulate between the active layer 64 and the gate electrode 70G, a first insulating layer 66 including an inorganic material, such as a silicon oxide, a silicon nitride, a silicon oxynitride, and/or the like, may be disposed between the active layer 64 and the gate electrode 70G. A second insulating layer 68 including an inorganic material, such as a silicon oxide, a silicon nitride, a silicon oxynitride, and/or the like may be disposed above the gate electrode 70G, and the source electrode 70S and the drain electrode 70D may be disposed on the second insulating layer 68. The source electrode 70S and the drain electrode 70D may be electrically connected to the active layer 64 through contact holes formed in the second insulating layer 68 and the first insulating layer 66.

A third insulating layer 72 covering the thin film transistor 70 may be disposed on the thin film transistor 70. The third insulating layer 72 may have a flat upper surface so that the pixel electrode 82 may be formed flat. The third insulating layer 72 may include an organic material, such as an acrylic material, benzocyclobutene (BCB), polyimide (PI), hexamethyldisiloxane (HMDSO), or the like. Although FIG. 3 illustrates that the third insulating layer 72 is a single layer, the disclosure is not limited thereto, and the third insulating layer 72 may be a multilayer.

The third insulating layer 72 may include a via hole for exposing one of the source electrode 70S and the drain electrode 70D of the thin film transistor 70, and the pixel electrode 82 may contact one of the source electrode 70S and the drain electrode 70D via the via hole and may be electrically connected to the thin film transistor 70. As shown in FIG. 3, in an embodiment, the pixel electrode 82 may be connected to the drain electrode 70D.

An organic light-emitting diode OLED including the pixel electrode 82, the intermediate layer 86 disposed on the pixel electrode 82 and including an organic emission layer, and the counter electrode 88 may be disposed on the third insulating layer 72.

The pixel electrode 82 may be formed as a reflective electrode. In case that the pixel electrode 82 is formed as a reflective electrode, the pixel electrodes 82 may include a reflective film including Ag, Mg, Al, Pt, Pd. Au, Ni, Nd, Ir, Cr, a compound thereof, a combination thereof, or the like, and a transparent conductive layer disposed above and/or below the reflective film. The transparent conductive layer may include at least one selected from the group consisting of indium tin oxide (ITO), indium zinc oxide (IZO), zinc oxide (ZnO), indium oxide ($In_2O_3$), indium gallium oxide (IGO), and Al-zinc oxide (AZO). The disclosure is not limited thereto, and various modifications are possible, for example, the pixel electrode 82 may include various materials, and may be a single layer or a multilayer, and the like.

The pixel defining layer 84 covering an edge area of the pixel electrode 82 may be disposed on the third insulating layer 72. The pixel defining layer 84 may have an opening exposing at least a portion of the pixel electrode 82 and may define a pixel. The pixel defining layer 84 as described above may include an organic material, such as, PI, HMDSO, or the like. The pixel defining layer 84 may be a single layer or multilayer.

The intermediate layer 86 may be disposed on the pixel electrode 82 exposed by the pixel defining layer 84. The intermediate layer 86 may include an organic emission layer (EML), and may further include functional layers, such as a hole injection layer (HIL), a hole transport layer (HTL), an organic emission layer (EML), an electron transport layer (ETL), an electron injection layer (EIL), and/or the like. The structure of the intermediate layer 86 is not limited thereto, and may have various structures. The intermediate layer 86 may include an integrated layer over multiple pixel electrodes 82, or a layer patterned to correspond to each of the pixel electrodes 82.

The counter electrode 88 may be disposed on the intermediate layer 86. The counter electrode 88, unlike the pixel electrode 82, may be integrally formed over multiple pixels.

The counter electrode 88 may be formed as a (semi-)transparent electrode. In case that the counter electrode 88 is formed as a (semi-)transparent electrode, the counter electrode 88 may include at least one material selected from the group consisting of Ag, Al, Mg, Li, Ca, Cu, a lithium/calcium (LiF/Ca) fluoride, a lithium/aluminum (LiF/Al) fluoride, a magnesium-silver (MgAg) alloy, and a calcium-silver (CaAg), and may be in the form of a thin film having a thickness of several to tens of nanometers (nm). The structure and material of the counter electrode 88 are not limited thereto, and various modifications are possible.

A thin film encapsulation layer 90 may be disposed on the counter electrode 88. The thin film encapsulation layer 90 may seal the organic light-emitting diode OLED to prevent the organic light-emitting diode OLED from being exposed to external air or foreign materials, and as the thin film encapsulation layer 90 has a very thin thickness, the thin film encapsulation layer 90 may be used as an encapsulation means for flexible display apparatuses capable of bending, folding, or the like.

The thin film encapsulation layer 90 may include a first inorganic film 91, an organic film 92, and a second inorganic film 93, which are sequentially arranged above the counter electrode 110. The first inorganic film 91 may include a silicon oxide, a silicon nitride, a silicon oxynitride, and/or the like. The first inorganic film 91, which is formed along a structure thereunder, may have an upper surface that is not flat, as illustrated in FIG. 3. The organic film 92 may cover the first inorganic film 91 and form a flat upper surface. The organic film 92 may include at least one material selected from the group consisting of polyethylene terephthalate, polyethylene naphthalate, polycarbonate, PI, polyethylene sulfonate, polyoxymethylene, polyarylate, and hexamethyl-disiloxane. The second inorganic film 93 may cover the organic film 92, and may include a silicon oxide, a silicon nitride, a silicon oxynitride, and/or the like. Although FIG. 3 illustrates that, as an example, the thin film encapsulation layer 90 includes only one organic film 92, the disclosure is not limited thereto, and the thin film encapsulation layer 90 may have a structure in which several layers of organic films and inorganic films are alternately stacked each other.

A touch electrode layer TEL including touch electrodes may be disposed above the thin film encapsulation layer 90, and an optical functional layer OFL may be disposed on the touch electrode layer TEL. The touch electrode layer TEL may obtain an external input, for example, coordinates information according to a touch event. The optical functional layer OFL may reduce reflectivity of light (external light) externally incident on the display apparatus 1, and improve color purity of light emitted from the display apparatus 1.

In an embodiment, the optical functional layer OFL may include a retarder and/or a polarizer. The retarder may be of a film type or a liquid crystal coating type, and may include a $\lambda/2$ retarder and/or a $\lambda/4$ retarder. The polarizer may be of a film type or a liquid crystal coating type. The film type may include a stretchable synthetic resin film, and the liquid crystal coating type may include liquid crystals arranged in a certain array. The retarder and the polarizer may further include a protective film.

In an embodiment, the optical functional layer OFL may include a destructive interference structure. The destructive interference structure may include a first reflective layer and a second reflective layer, which are disposed on different layers. First reflected light and second reflected light respectively reflected from the first reflective layer and the second reflective layer may be destructively interfered, and accordingly, the reflectivity of external light may be reduced.

An adhesive member may be disposed between the touch electrode layer TEL and the optical functional layer OFL. Any adhesive material may be employed as the adhesive member. For example, the adhesive member may include a pressure sensitive adhesive (PSA).

The cover window CW may be disposed on the display layer DL. The cover window CW may adhere to the display layer DL by the adhesive member. The adhesive member may include, for example, a PSA.

The cover window CW may have high transmittance to transmit light emitted from the display layer DL. In an embodiment, the transmittance of the cover window CW may be greater than or equal to about 85%, and the transmission haze of the cover window CW may be less than or equal to about 2%, but the disclosure is not limited thereto.

Figure 4:
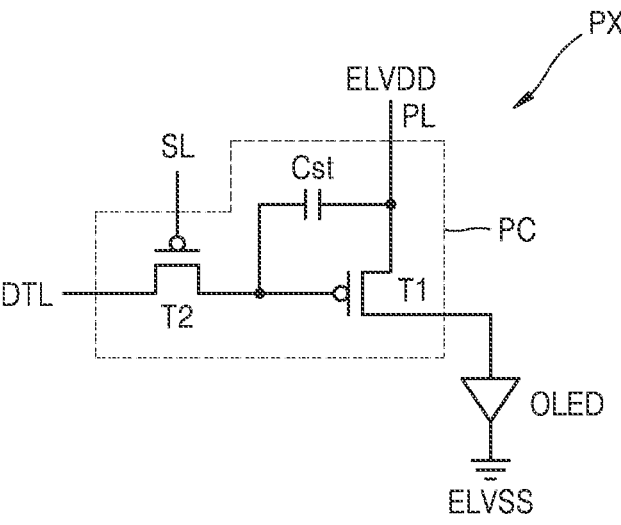
FIG. 4 is a schematic diagram of an equivalent circuit of a pixel of a display panel according to an embodiment.

FIG. 4 is a schematic diagram of an equivalent circuit of a pixel of a display panel according to an embodiment.

Each pixel PX may include a pixel circuit PC, and a display element, for example, the organic light-emitting diode OLED, electrically connected to the pixel circuit PC. The pixel circuit PC may include a first thin film transistor T1, a second thin film transistor T2, and a storage capacitor Cst. Each pixel PX may emit, for example, red, green, blue, or white light through the organic light-emitting diode OLED.

The second thin film transistor T2, as a switching thin film transistor, may be connected to a scan line SL and a data line DTL, and may transmit a data voltage input from the data line DTL to the first thin film transistor T1, in response to a switching voltage input from the scan line SL. The storage capacitor Cst may be connected to the second thin film transistor T2 and a driving voltage line PL, and may store a voltage corresponding to a difference between a voltage received from the second thin film transistor T2 and a first power voltage ELVDD supplied through the driving voltage line PL.

The first thin film transistor T1, as a driving thin film transistor, may be connected to the driving voltage line PL and the storage capacitor Cst, and may control a driving current flowing through the driving voltage line PL to the organic light-emitting diode OLED, in response to a voltage value stored in the storage capacitor Cst. The organic light-emitting diode OLED may emit light having a luminance by the driving current. A counter electrode (e.g., a cathode) of the organic light-emitting diode OLED may receive a second power voltage ELVSS.

Although FIG. 4 illustrates that the pixel circuit PC includes two thin film transistors and one storage capacitor, the disclosure is not limited thereto. The number of thin film transistors and the number of storage capacitors may be variously changed depending on the design of the pixel circuit PC. For example, the pixel circuit PC may further include four, five or more thin film transistors, in addition to the two thin film transistors described above.

Figure 5:
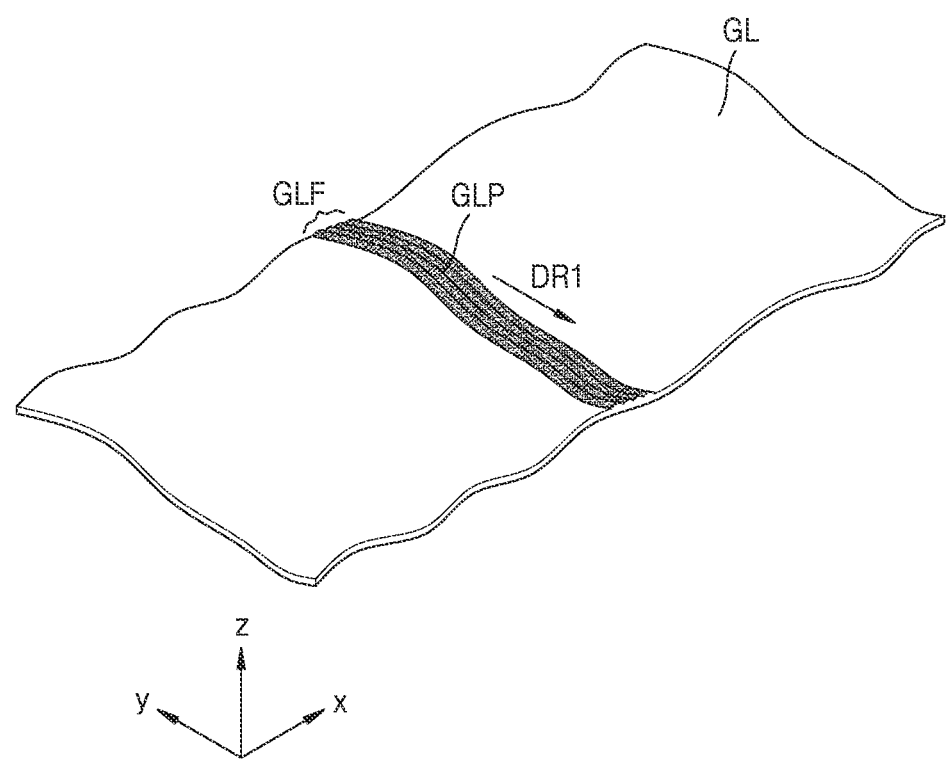
FIG. 5 is a schematic perspective view of glass according to an embodiment.

FIG. 5 is a schematic perspective view of glass GL according to an embodiment.

In the following description, the glass GL described with reference to FIG. 5 may include the cover window CW described with reference to FIG. 3.

Referring to FIG. 5, the glass GL may include a folding area GLF foldable with respect to the folding axis FAX described with reference to FIG. 1. The folding area GLF may have a glass pattern GLP extending in a first direction DR1, for example, a y-axis direction. The first direction DR1 may be a direction parallel to the folding axis FAX. Although FIG. 5 illustrates only one folding area, the disclosure is not limited thereto, and multiple folding areas GLF may be arranged spaced apart from each other.

In the process of manufacturing the glass GL, compression stress may be formed on the surface of the glass GL. Ions on the surface of the glass GL may be substituted with ions having a relatively large radius. For example, sodium ions (Na+) on the surface of the glass GL may be substituted with potassium ions (K+). Accordingly, compression stress may be formed on the surface area of the glass GL, and thus, strength of the glass GL may be improved. Due to the compression stress formed on the surface of the glass GL, a curved surface may be formed on the glass GL in a natural state. In other words, a free surface may be formed on the glass GL.

Figure 6:
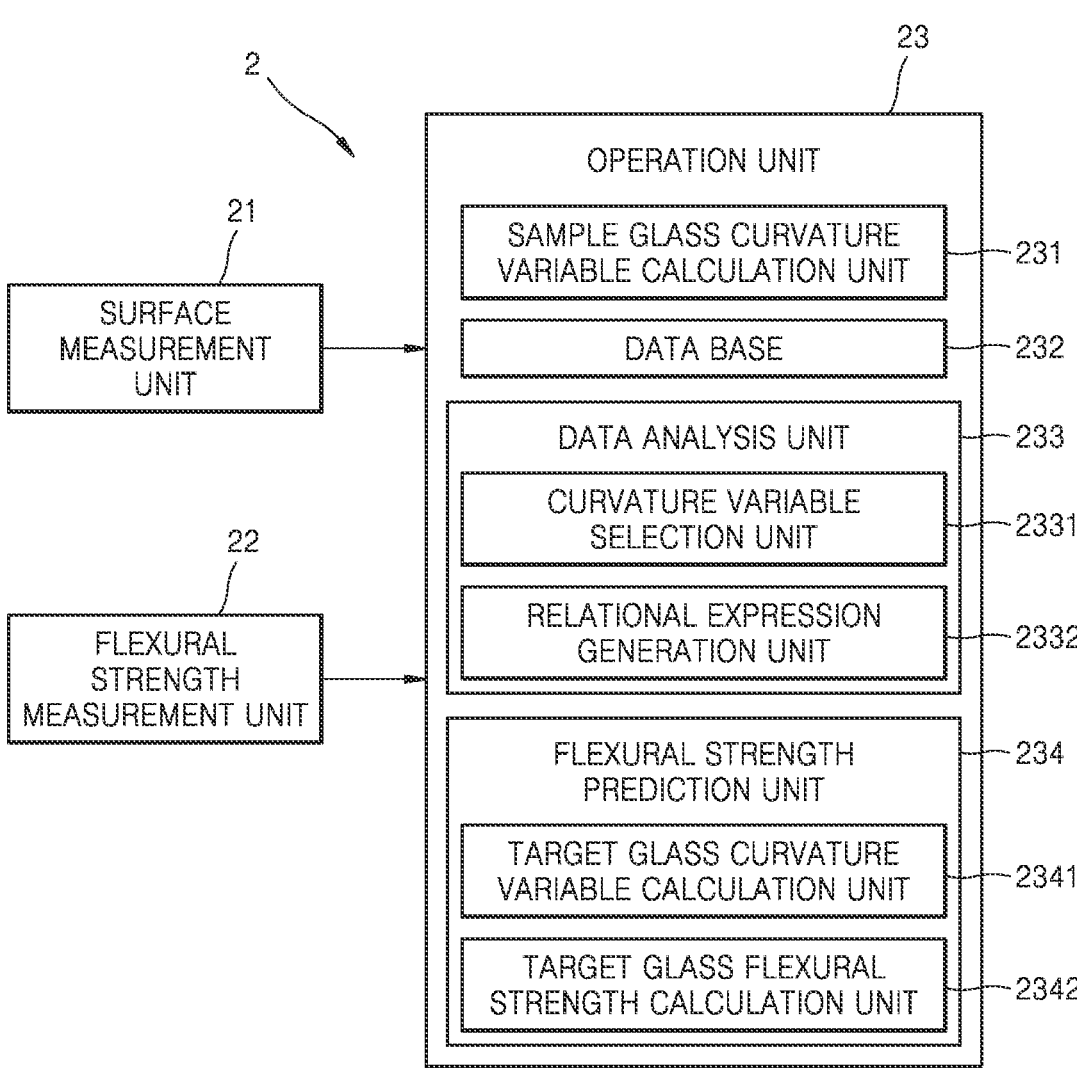
FIG. 6 is a schematic block diagram of an apparatus for inspecting a display apparatus, according to an embodiment.
Figure 7:
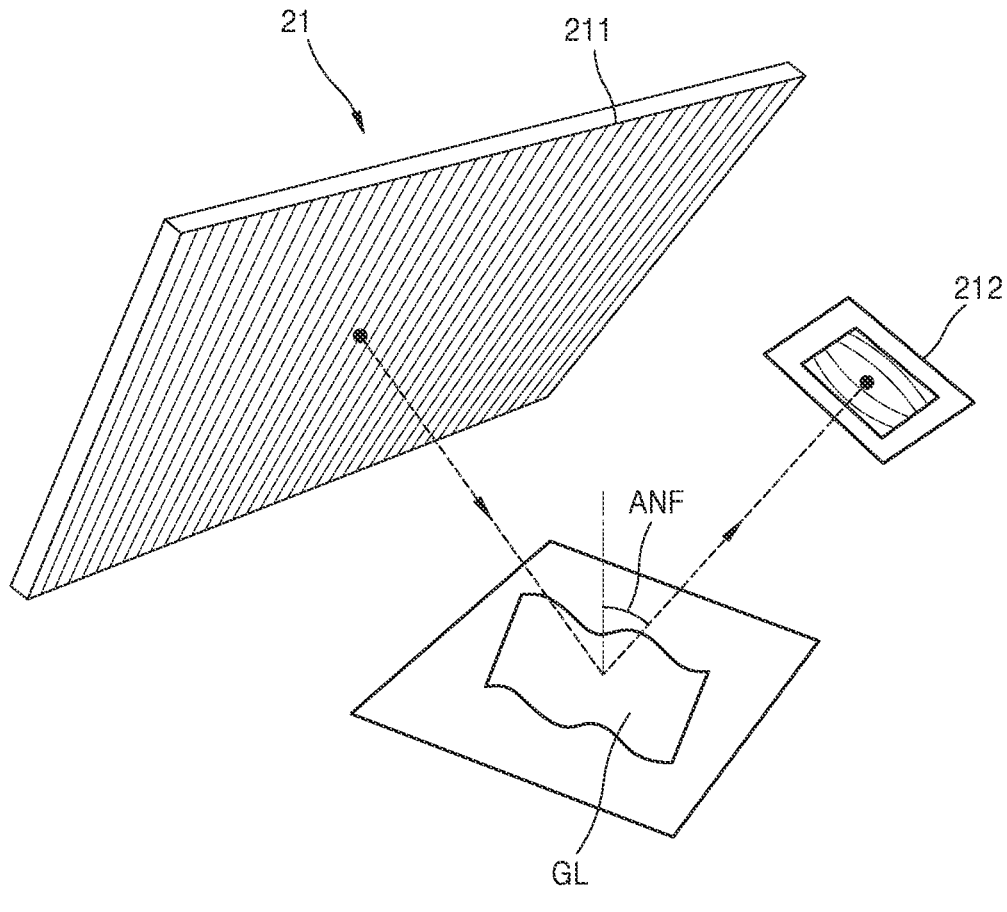
FIG. 7 is a schematic view of a surface measurement unit according to an embodiment.
Figure 8:
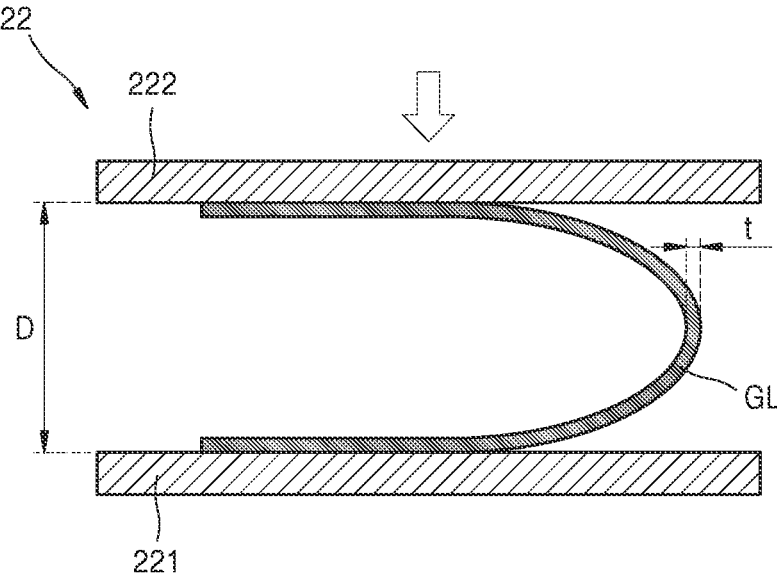
FIG. 8 is a schematic cross-sectional view of a flexural strength measurement unit according to an embodiment.
Figure 9:
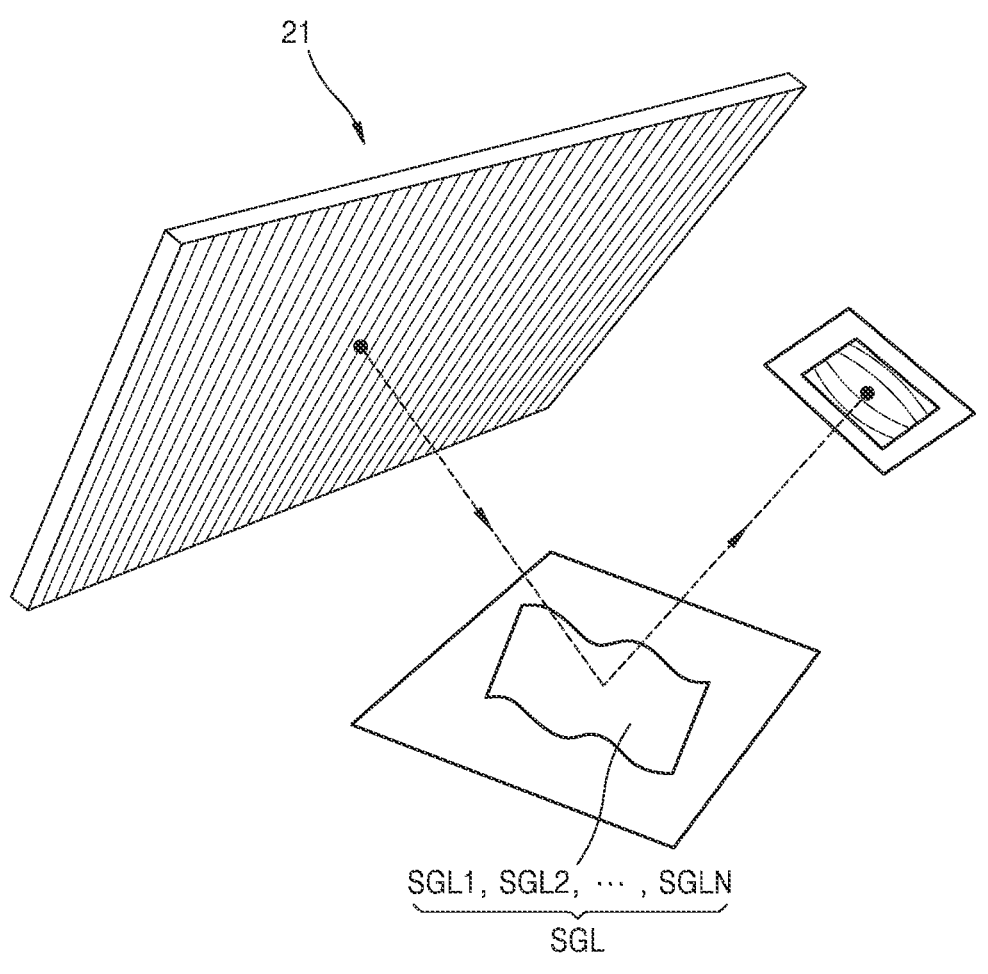
FIGS. 9 to 11 are views for explaining a process in which the apparatus for inspecting a display apparatus according to an embodiment inspects the flexural strength of a foldable display apparatus.
Figure 10:
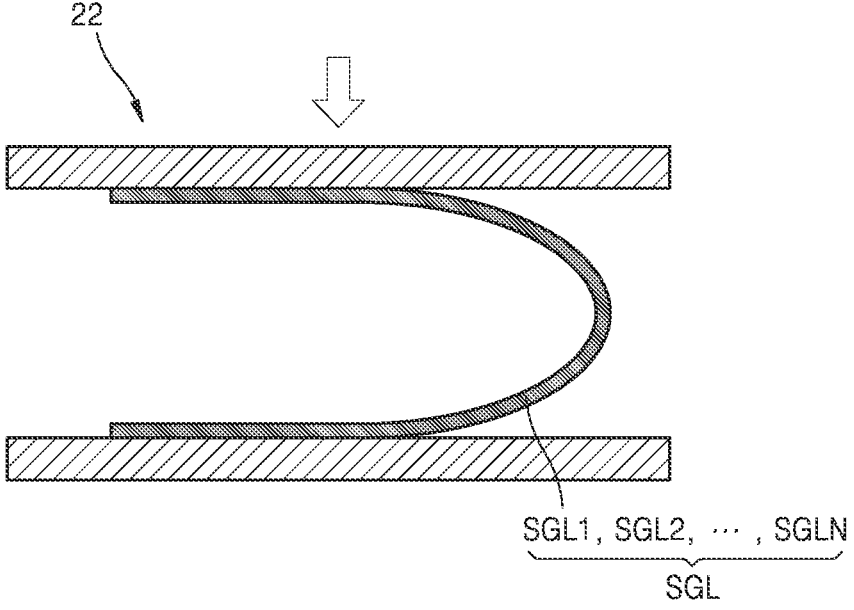
Figure 11:
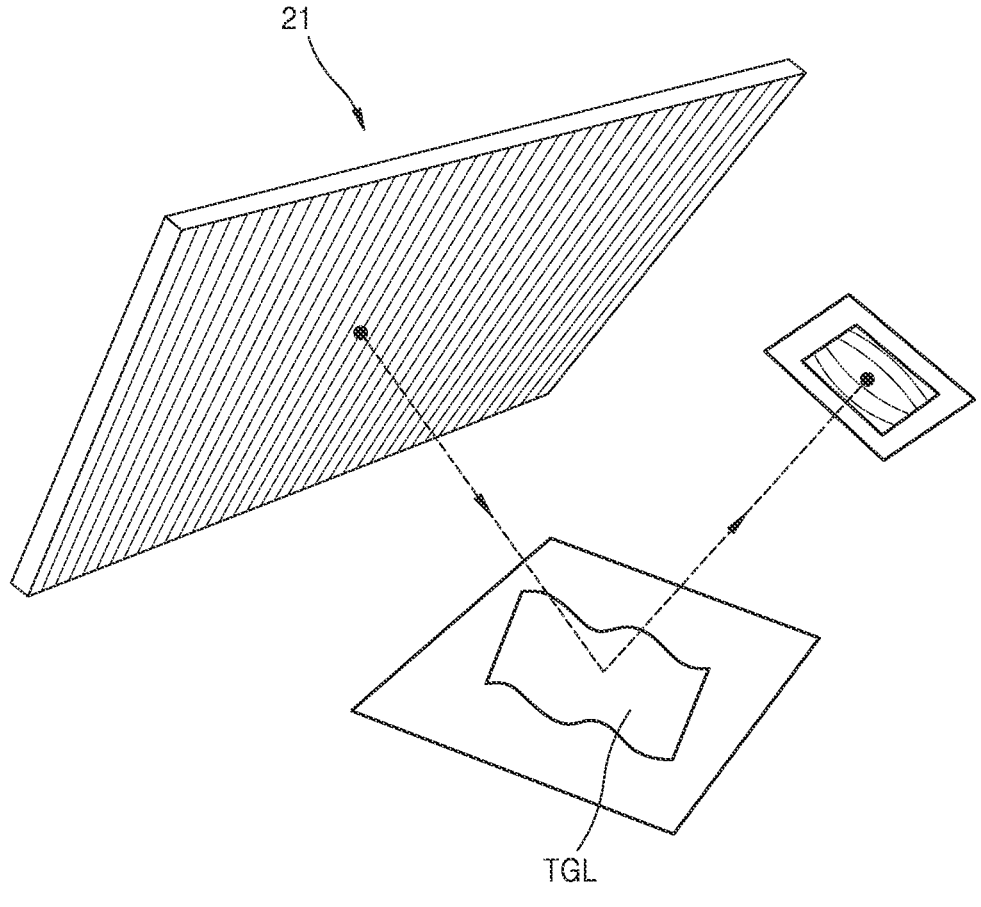

FIG. 6 is a schematic block diagram of an apparatus 2 for inspecting a display apparatus, according to an embodiment. FIG. 7 is a schematic view of a surface measurement unit 21 according to an embodiment. FIG. 8 is a schematic cross-sectional view of a flexural strength measurement unit 22 according to an embodiment. FIGS. 9 to 11 are views for explaining a process in which the apparatus 2 for inspecting a display apparatus according to an embodiment inspects the flexural strength of a foldable display apparatus.

Referring to FIGS. 6 to 11, the apparatus 2 for inspecting a display apparatus may inspect the flexural strength of the glass GL including a folding area. The apparatus 2 for inspecting a display apparatus may predict the flexural strength of target glass TGL based on data acquired from multiple pieces of sample glass SGL.

The sample glass SGL may be a glass sample for acquiring data among the glass GL described with reference to FIG. 5. For example, the sample glass SGL may include a first sample glass SGL1, a second sample glass SGL2, . . . , and an N-th sample glass SGLN. The target glass TGL may be glass subject to the prediction of flexural strength among the glass GL described with reference to FIG. 5.

Accordingly, the apparatus 2 for inspecting a display apparatus may predict the flexural strength of the target glass TGL without damaging the target glass TGL. Furthermore, the apparatus 2 for inspecting a display apparatus may reduce waste of manpower and improve efficiency and accuracy because a process of checking, by a worker, damage of the target glass TGL with the naked eye is omitted. Furthermore, the apparatus 2 for inspecting a display apparatus may prevent an issue due to particles scattering by the damage to the target glass TGL. The apparatus 2 for inspecting a display apparatus may predict the flexural strength of the target glass TGL even in case that a separate film is attached to the sample glass SGL and the target glass TGL.

The apparatus 2 for inspecting a display apparatus may include a surface measurement unit 21, a flexural strength measurement unit 22, and an operation unit 23.

Referring to FIG. 7, the surface measurement unit 21 may measure a three-dimensional shape of the surface of the glass GL. For example, the surface measurement unit 21 may measure the three-dimensional shape of the surface of the glass GL by using a phase measuring deflectometry. The surface measurement unit 21 may include a screen unit 211 and a camera unit 212.

The screen unit 211 may output pattern light to be irradiated onto the surface of the glass GL. The camera unit 212 may measure the pattern light reflected from the surface of the glass GL. The surface measurement unit 21 may measure a slope on the surface of the glass GL based on a reflection angle ANF of the pattern light reflected from the surface of the glass GL. The surface measurement unit 21 may measure the three-dimensional shape of the surface of the glass GL by integrating the measured slope of the surface of the glass GL. The surface measurement unit 21 may accurately and quickly measure a three-dimensional shape of a large surface of the glass GL by using a phase measuring deflectometry.

Referring to FIG. 8, the flexural strength measurement unit 22 may measure flexural strength of the glass GL. The flexural strength measurement unit 22 may include a first plate 221 and a second plate 222 spaced apart from and parallel to the first plate 221. A distance between the first plate 221 and the second plate 222 may be adjustable. The glass GL may be positioned in a folding state between the first plate 221 and the second plate 222. The flexural strength measurement unit 22 may gradually decrease the distance between the first plate 221 and the second plate 222 until a damage occurs on the glass GL.

The flexural strength measurement unit 22 may measure the distance between the first plate 221 and the second plate 222 at the moment a damage occurs on the glass GL. For example, the flexural strength measurement unit 22 may measure a distance D between the first plate 221 and the second plate 222 in case that the maximum repulsive force is applied to the glass GL, for example, just before the glass GL is damaged. A flexural strength may be calculated by Equation 1 below.

$$\sigma = 1.19814 E \frac{t}{D-t} \qquad \text{[Equation 1]}$$

$\sigma$ may be a flexural strength, t may be a thickness of glass in a folding area, D may be a distance between the first plate 221 and the second plate 222 in case that a maximum repulsive force is applied to glass, and E may be Young's modulus of the glass.

The operation unit 23 may operate (or calculate) the flexural strength of the target glass TGL. The operation unit 23 may include a sample glass curvature variable calculation unit 231, a database 232, a data analysis unit 233, and a flexural strength prediction unit 234.

Referring to FIGS. 6 and 9, the surface measurement unit 21 may measure a three-dimensional shape of a surface of each of the sample glass SGL. For example, the surface measurement unit 21 may measure a three-dimensional shape of the surface of the first sample glass SGL1, a three-dimensional shape of the surface of the second sample glass SGL2, . . . , and a three-dimensional shape of the surface of the N-th sample glass SGLN. For example, the surface measurement unit 21 may measure three-dimensional shapes of the surfaces of the sample glass SGL by using a phase measuring deflectometry.

The sample glass curvature variable calculation unit 231 may calculate multiple curvature variables for each of the sample glass SGL based on the three-dimensional shape of the surface of each of the sample glass SGL. For example, the sample glass curvature variable calculation unit 231 may calculate multiple curvature variables of the first sample glass SGL1, multiple curvature variables of the second sample glass SGL2, . . . , and multiple curvature variables of the N-th sample glass SGLN.

The curvature variables may be variables related to curvature of a curved surface. The curvature variables may include at least two of a curvature average of the entire surface, a curvature standard deviation of the entire surface, a curvature absolute value average of the entire surface, a curvature absolute value standard deviation of the entire surface, a curvature average of the folding area, a curvature standard deviation of the folding area, a curvature absolute value average of the folding area, and a curvature absolute value standard deviation of the folding area.

For example, the curvature variables may include all of a curvature average of the entire surface, a curvature standard deviation of the entire surface, a curvature absolute value average of the entire surface, a curvature absolute value standard deviation of the entire surface, a curvature average of the folding area, a curvature standard deviation of the folding area, a curvature absolute value average of the folding area, and a curvature absolute value standard deviation of the folding area.

The entire surface may mean an entire surface of the glass GL described with reference to FIG. 5, and the folding area may mean a folding area GLF of the glass GL described with reference to FIG. 5.

For convenience of explanation, it is assumed that the curvature of the entire surface is calculated as +0.5, −0.5, +0.5, and −0.5, and the curvature of the folding area is calculated as +0.3, −0.3, +0.3, and −0.3. The curvature average of the entire surface may be 0, the curvature standard deviation of the entire surface may be 0.5, the curvature absolute value average of the entire surface may be 0.5, and the curvature absolute value standard deviation of the entire surface may be 0. The curvature average of the folding area may be 0, the curvature standard deviation of the folding area may be 0.3, the curvature absolute value average of the folding area may be 0.3, and the curvature absolute value standard deviation of the folding area may be 0.

Referring to FIGS. 6 and 10, the flexural strength measurement unit 22 may measure a flexural strength of each of the sample glass SGL. For example, the flexural strength measurement unit 22 may measure the flexural strength of the first sample glass SGL1, the flexural strength of the second sample glass SGL2, . . . , and the flexural strength of the N-th sample glass SGLN.

Referring to FIGS. 6 to 10, the database 232 may store the curvature variables calculated by the sample glass curvature variable calculation unit 231 and data about the flexural strength of each of the sample glass SGL measured by the flexural strength measurement unit 22. For example, the database 232 may store data about the curvature variables and flexural strength of the first sample glass SGL1, the curvature variables and flexural strength of the second sample glass SGL2, . . . , and the curvature variables and flexural strength of the N-th sample glass SGLN.

The data analysis unit 233 may analyze the data stored in the database 232. The data analysis unit 233 may analyze a correlation between the curvature variables and the flexural strength. The data analysis unit 233 may follow multiple regression analysis methods, and dependent variables may be set to be flexural strength and independent variables may be set to be multiple curvature variables. The data analysis unit 233 may include a curvature variable selection unit 2331 and a relational expression generation unit 2332.

The curvature variable selection unit 2331 may select multiple correlative curvature variables correlated to the flexural strength among the curvature variables. For example, the curvature variable selection unit 2331 may select two curvature variables having the highest correlation with flexural strength by analyzing a correlation between the curvature variables and the flexural strength.

For example, the curvature variable selection unit 2331 may select a curvature average of the folding area and a curvature standard deviation of the folding area among the curvature variables. For example, the correlative curvature variables may include a curvature average of the folding area and a curvature standard deviation of the folding area. However, the disclosure is not limited thereto, and the correlative curvature variables may include all the curvature variables.

The relational expression generation unit 2332 may generate a relational expression between the curvature variables and the flexural strength. As described above, flexural strength may be set to be a dependent variable, and the curvature variables may be set to be independent variables. For example, the relational expression generation unit 2332 may generate a relational expression between flexural strength and the correlative curvature variables among the curvature variables. For example, flexural strength may be set to be a dependent variable, and the correlative curvature variables may be set to be independent variables. For example, the relational expression generation unit 2332 may generate a relational expression in which a dependent variable is flexural strength and independent variables are a curvature average of the folding area and a curvature standard deviation of the folding area.

Referring to FIGS. 6 and 11, the flexural strength prediction unit 234 may predict the flexural strength of the target glass TGL based on the relational expression generated by the relational expression generation unit 2332. The flexural strength prediction unit 234 may include a target glass curvature variable calculation unit 2341 and a target glass flexural strength calculation unit 2342.

First, the surface measurement unit 21 may measure a three-dimensional shape of the target glass TGL. For example, the surface measurement unit 21 may measure a three-dimensional shape of the surface of the target glass TGL by using a phase measuring deflectometry.

The target glass curvature variable calculation unit 2341 may calculate multiple curvature variables of the target glass TGL based on the three-dimensional shape of the surface of the target glass TGL.

The curvature variables calculated by the target glass curvature variable calculation unit 2341 may correspond to the curvature variables calculated by the sample glass curvature variable calculation unit 231. For example, the curvature variables calculated by the target glass curvature variable calculation unit 2341 may include a curvature average of the entire surface, a curvature standard deviation of the entire surface, a curvature absolute value average of the entire surface, a curvature absolute value standard deviation of the entire surface, a curvature average of the folding area, a curvature standard deviation of the folding area, a curvature absolute value average of the folding area, and a curvature absolute value standard deviation of the folding area.

The target glass curvature variable calculation unit 2341 may calculate multiple correlative curvature variables selected from the curvature variable selection unit 2331, which are described above, among the curvature variables of the target glass TGL. For example, the target glass curvature variable calculation unit 2341 may calculate a curvature average of the folding area and a curvature standard deviation of the folding area among the curvature variables of the target glass TGL.

The target glass flexural strength calculation unit 2342 may calculate the flexural strength of the target glass TGL by inputting the curvature variables calculated by the target glass curvature variable calculation unit 2341 in the relational expression generated by the relational expression generation unit 2332 described above.

The target glass flexural strength calculation unit 2342 may calculate the flexural strength of the target glass TGL by inputting the correlative curvature variables of the curvature variables in the relational expression. For example, the target glass flexural strength calculation unit 2342 may calculate the flexural strength of the target glass TGL by inputting a curvature average of the folding area and a curvature standard deviation of the folding area of the target glass TGL calculated by the target glass curvature variable calculation unit 2341, in the relational expression in which a dependent variable is flexural strength and independent variables are a curvature average of the folding area and a curvature standard deviation of the folding area, which are calculated by the relational expression generation unit 2332.

Figure 12:
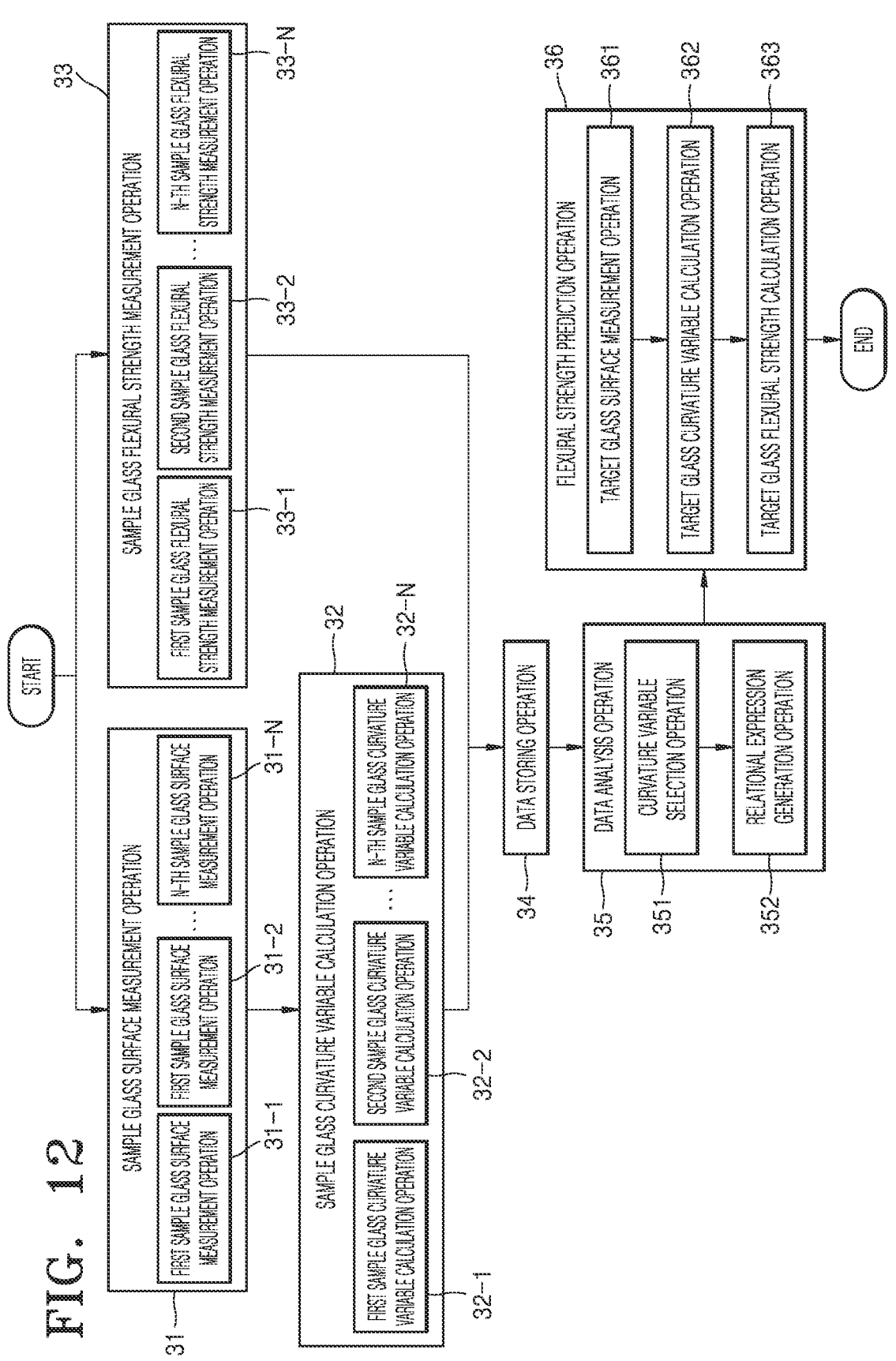
FIG. 12 is a flowchart of a method of inspecting a display apparatus, according to an embodiment.

FIG. 12 is a flowchart of a method of inspecting a display apparatus, according to an embodiment.

In FIG. 12, the same reference numerals in those in FIGS. 6 to 11 refer to the same elements, and redundant descriptions thereof are omitted.

Referring to FIGS. 6 to 12, a method of inspecting a display apparatus may include inspecting the flexural strength of the glass GL including a folding area. The method of inspecting a display apparatus may include a sample glass surface measurement operation 31, a sample glass curvature variable calculation operation 32, a sample glass flexural strength measurement operation 33, a data storing operation 34, a data analysis operation 35, and a flexural strength prediction operation 36.

The sample glass surface measurement operation 31 may be an operation of measuring, by the surface measurement unit 21, the three-dimensional shape of the surface of each of the sample glass SGL. For example, the sample glass surface measurement operation 31 may include a first sample glass surface measurement operation 31-1 of measuring a three-dimensional shape of a surface of the first sample glass SGL1, a second sample glass surface measurement operation 31-2 of measuring a three-dimensional shape of a surface of the second sample glass SGL2, . . . , and an N-th sample glass surface measurement operation 31-N of measuring a three-dimensional shape of a surface of the N-th sample glass SGLN. For example, the sample glass surface measurement operation 31 may be an operation of measuring the three-dimensional shape of the surface of each of the sample glass SGL by using a phase measuring deflectometry.

The sample glass curvature variable calculation operation 32 may be an operation of calculating, by the sample glass curvature variable calculation unit 231, multiple curvature variables of each of the sample glass SGL based on the information measured by the sample glass surface measurement operation 31. For example, the sample glass curvature variable calculation operation 32 may include a first sample glass curvature variable calculation operation 32-1 of calculating multiple curvature variables of the first sample glass SGL1, a second sample glass curvature variable calculation operation 32-2 of calculating multiple curvature variables of the second sample glass SGL2, . . . , and an N-th sample glass curvature variable calculation operation 32-N of calculating multiple curvature variables of the N-th sample glass SGLN.

The sample glass flexural strength measurement operation 33 may be an operation of measuring, by the flexural strength measurement unit 22, the flexural strength for each of the sample glass SGL. For example, the sample glass flexural strength measurement operation 33 may include a first sample glass flexural strength measurement operation 33-1 of measuring flexural strength of the first sample glass SGL1, a second sample glass flexural strength measurement operation 33-2 of measuring flexural strength of the second sample glass SGL2, . . . , and an N-th sample glass flexural strength measurement operation 33-N of measuring flexural strength of the N-th sample glass SGLN.

The data storing operation 34 may be an operation of storing, in the database 232, data about the curvature variables calculated by the sample glass curvature variable calculation operation 32 and the flexural strength measured by the sample glass flexural strength measurement operation 33.

The data analysis operation 35 may be an operation of analyzing, by the data analysis unit 233, the data stored in the database 232. The data analysis operation 35 may be an operation of analyzing a correlation between the curvature variables and the flexural strength. The data analysis operation 35 may follow a multiple regression analysis method. The data analysis operation 35 may include a curvature variable selection operation 351 and a relational expression generation operation 352.

The curvature variable selection operation 351 may be an operation of selecting, by the curvature variable selection unit 2331, multiple correlative curvature variables correlated to the flexural strength among the curvature variables.

The relational expression generation operation 352 may be an operation of generating, by the relational expression generation unit 2332, a relational expression between the curvature variables and the flexural strength. The relational expression generation operation 352 may be an operation of generating a relational expression between the correlative curvature variables and the flexural strength.

The flexural strength prediction operation 36 may be an operation of predicting, by the flexural strength prediction unit 234, the flexural strength of the target glass TGL based on the relational expression described above. The flexural strength prediction operation 36 may include a target glass surface measurement operation 361, a target glass curvature variable calculation operation 362, and a target glass flexural strength calculation operation 363.

The target glass surface measurement operation 361 may be an operation of measuring, by the surface measurement unit 21, the three-dimensional shape of the surface of the target glass TGL. For example, the target glass surface measurement operation 361 may be an operation of measuring the three-dimensional shape of the surface of the target glass TGL by using a phase measuring deflectometry.

The target glass curvature variable calculation operation 362 may be an operation of calculating, by the target glass curvature variable calculation unit 2341, multiple curvature variables of the target glass TGL based on the information measured in the target glass surface measurement operation 361. The target glass curvature variable calculation operation 362 may be an operation of calculating multiple correlative curvature variables of the target glass TGL.

The target glass flexural strength calculation operation 363 may be an operation of calculating, by the target glass flexural strength calculation unit 2342, the flexural strength of the target glass TGL by inputting the curvature variables calculated in the target glass curvature variable calculation operation 362 in a relational expression. The target glass flexural strength calculation operation 363 may be an operation of calculating the flexural strength of the target glass TGL by inputting the correlative curvature variables in a relational expression.

According to an embodiment, the apparatus for inspecting a display apparatus may predict the flexural strength of glass without damaging the glass, and thus, reduce waste of manpower and improve efficiency and accuracy because a process of checking, by a worker, damage of the glass with the naked eye is omitted.

The effects of the disclosure are not limited to the above-described effects, and other various effects that are not described in the specification may be clearly understood from the following descriptions by one skilled in the art to which the disclosure belongs.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A method of inspecting a flexural strength of a glass including a folding area of a display apparatus, the method comprising:

a sample glass surface measurement operation of measuring a three-dimensional shape of a surface of each of a plurality of sample glasses;

a sample glass curvature variable calculation operation of calculating a plurality of curvature variables of the each of the plurality of sample glasses based on an information measured in the sample glass surface measurement operation;

a sample glass flexural strength measurement operation of measuring a flexural strength of the each of the plurality of sample glasses;

a data analysis operation comprising a relational expression generation operation of generating a relational expression between the plurality of curvature variables and the flexural strength; and a flexural strength prediction operation of predicting a flexural strength of a target glass based on the relational expression, wherein the flexural strength prediction operation comprises:

a target glass surface measurement operation of measuring a three-dimensional shape of a surface of the target glass;

a target glass curvature variable calculation operation of calculating a plurality of curvature variables of the target glass based on an information measured in the target glass surface measurement operation; and a target glass flexural strength calculation operation of calculating the flexural strength of the target glass by inputting the plurality of curvature variables calculated in the target glass curvature variable calculation operation in the relational expression.

2. The method of claim 1, wherein the data analysis operation further comprises a curvature variable selection operation of selecting a plurality of correlative curvature variables correlated to the flexural strength among the plurality of curvature variables, and the relational expression generation operation is an operation of generating a relational expression between the plurality of correlative curvature variables and the flexural strength.

3. The method of claim 2, wherein the target glass curvature variable calculation operation is an operation of calculating the plurality of correlative curvature variables of the target glass.

4. The method of claim 3, wherein the target glass flexural strength calculation operation is an operation of calculating the flexural strength of the target glass by inputting the plurality of correlative curvature variables in the relational expression.

5. The method of claim 2, wherein the plurality of curvature variables comprise at least two of a curvature average of an entire surface, a curvature standard deviation of the entire surface, a curvature absolute value average of the entire surface, a curvature absolute value standard deviation of the entire surface, a curvature average of the folding area, a curvature standard deviation of the folding area, a curvature absolute value average of the folding area, and a curvature absolute value standard deviation of the folding area.

6. The method of claim 5, wherein the plurality of correlative curvature variables comprise the curvature average of the folding area and the curvature standard deviation of the folding area.

7. The method of claim 1, further comprising:

a data storing operation of storing data about the plurality of curvature variables calculated in the sample glass curvature variable calculation operation and the flexural strength measured in the sample glass flexural strength measurement operation.

8. The method of claim 1, wherein the data analysis operation follows a multiple regression analysis method.

9. The method of claim 1, wherein the sample glass surface measurement operation is an operation of measuring the three-dimensional shape of the surface of the each of the plurality of sample glasses by using a phase measuring deflectometry.

10. The method of claim 1, wherein the target glass surface measurement operation is an operation of measuring the three-dimensional shape of the surface of the target glass by using a phase measuring deflectometry.

11. An apparatus for inspecting a flexural strength of a glass including a folding area of a display apparatus, the apparatus comprising:

a surface measurement part that measures a three-dimensional shape of a surface of each of a plurality of sample glasses and a target glass;

a flexural strength measurement part that measures a flexural strength of the each of the plurality of sample glasses; and an operation part that calculates a flexural strength of the target glass, wherein the operation part comprises:

a sample glass curvature variable calculation part that calculates a plurality of curvature variables of the each of the plurality of sample glasses based on the three-dimensional shape of the surface of the each of the plurality of sample glasses;

a data analysis part comprising a relational expression generation part that generates a relational expression between the plurality of curvature variables and the flexural strength; and a flexural strength prediction part that predicts the flexural strength of the target glass based on the relational expression, and the flexural strength prediction part comprises:

a target glass curvature variable calculation part that calculates the plurality of curvature variables of the target glass based on the three-dimensional shape of the surface of the target glass; and a target glass flexural strength calculation part that calculates the flexural strength of the target glass by inputting the plurality of curvature variables calculated in the target glass curvature variable calculation part in the relational expression.

12. The apparatus of claim 11, wherein the data analysis part further comprises a curvature variable selection part that selects a plurality of correlative curvature variables correlated to the flexural strength among the plurality of curvature variables, and the relational expression generation part generates a relational expression between the plurality of correlative curvature variables and the flexural strength.

13. The apparatus of claim 12, wherein the target glass curvature variable calculation part calculates the plurality of correlative curvature variables of the target glass.

14. The apparatus of claim 13, wherein the target glass flexural strength calculation part calculates the flexural strength of the target glass by inputting the plurality of correlative curvature variables in the relational expression.

15. The apparatus of claim 12, wherein the surface of the each of the plurality of sample glasses includes a folding area that is foldable, and the plurality of curvature variables comprise at least two of a curvature average of an entire surface, a curvature standard deviation of the entire surface, a curvature absolute value average of the entire surface, a curvature absolute value standard deviation of the entire surface, a curvature average of the folding area, a curvature standard deviation of the folding area, a curvature absolute value average of the folding area, and a curvature absolute value standard deviation of the folding area.

16. The apparatus of claim 15, wherein the plurality of correlative curvature variables comprise the curvature average of the folding area and the curvature standard deviation of the folding area.

17. The apparatus of claim 11, wherein the operation part further comprises a database storing data about the plurality of curvature variables calculated by the sample glass curvature variable calculation part and the flexural strength of the each of the plurality of sample glasses measured by the flexural strength measurement part.

18. The apparatus of claim 11, wherein the data analysis part follows a multiple regression analysis method.

19. The apparatus of claim 11, wherein the surface measurement part measures the three-dimensional shape of the surface of the each of the plurality of sample glasses and the target glass by using a phase measuring deflectometry.

20. The apparatus of claim 19, wherein the surface measurement part comprises:

a screen part that outputs pattern light to be irradiated onto the surface of the each of the plurality of sample glasses and the target glass; and a camera part that measures the pattern light reflected from the surface of the each of the plurality of sample glasses and the target glass.

\* \* \* \* \*